United States Patent
Srinivasan et al.

(10) Patent No.: US 11,853,662 B2
(45) Date of Patent: Dec. 26, 2023

(54) MACHINE-LEARNING ENHANCED COMPILER

(71) Applicant: Synopsys, Inc., Mountain View, CA (US)

(72) Inventors: Sankaranarayanan Srinivasan, San Jose, CA (US); Senthilkumar Thoravi Rajavel, Hillsboro, OR (US); Vinod Kumar Nakkala, Sunnyvale, CA (US); Avinash Anantharamu, Sunnyvale, CA (US); Pierre Clement, Antony (FR); Saibal Ghosh, Sunnyvale, CA (US); Sashikala Oblisetty, Cupertino, CA (US); Etienne Lepercq, Shrewsbury, MA (US)

(73) Assignee: Synopsys, Inc., Sunnyvale, CA (US)

( * ) Notice: Subject to any disclaimer, the term of this patent is extended or adjusted under 35 U.S.C. 154(b) by 0 days.

(21) Appl. No.: 17/845,421

(22) Filed: Jun. 21, 2022

(65) Prior Publication Data
US 2022/0318468 A1 Oct. 6, 2022

Related U.S. Application Data

(63) Continuation of application No. 16/992,636, filed on Aug. 13, 2020, now Pat. No. 11,366,948.

(30) Foreign Application Priority Data

Oct. 18, 2019 (EP) ..................................... 19204152

(51) Int. Cl.
- *G06F 30/27* (2020.01)
- *G06F 30/3323* (2020.01)
- *G06F 119/12* (2020.01)

(52) U.S. Cl.
CPC .......... *G06F 30/27* (2020.01); *G06F 30/3323* (2020.01); *G06F 2119/12* (2020.01)

(58) Field of Classification Search
CPC .. G06F 30/27; G06F 30/3323; G06F 2119/12; G06F 30/327; G06F 30/331; G06F 30/337; G06F 30/343; G06F 30/347; G06F 30/392; G06F 30/394; G06F 30/34
See application file for complete search history.

(56) References Cited

U.S. PATENT DOCUMENTS

| | | | |
|---|---|---|---|
| 5,363,320 | A | 11/1994 | Boyle et al. |
| 5,933,356 | A | 8/1999 | Rostoker et al. |
| 6,735,743 | B1 | 5/2004 | McElvain |
| 8,046,727 | B2 | 10/2011 | Solomon |

(Continued)

OTHER PUBLICATIONS

PCT/US2020/047686 Communication Relating to the Results of the Partial International Search dated Dec. 15, 2020.

(Continued)

*Primary Examiner* — Nha T Nguyen
(74) *Attorney, Agent, or Firm* — Patterson + Sheridan, LLP

(57) ABSTRACT

A method includes storing a base model generated using base data and receiving training data generated by compiling circuit designs. The method also includes generating, using the training data, a tuned model and generating, using the training data and the base data, a hybrid model. The method further includes receiving a selected cost function and biasing the base model, the tuned model, and the hybrid model using the selected cost function.

17 Claims, 11 Drawing Sheets

(56) References Cited

U.S. PATENT DOCUMENTS

| | | | |
|---|---|---|---|
| 8,082,138 | B1 | 12/2011 | Bakshi et al. |
| 8,327,039 | B2 | 12/2012 | Chou et al. |
| 8,594,991 | B2 | 11/2013 | Birguer |
| 8,781,808 | B2 | 7/2014 | Yang |
| 8,924,898 | B2 | 12/2014 | Killian et al. |
| 9,792,397 | B1 * | 10/2017 | Nagaraja ............... G06F 30/32 |
| 9,983,852 | B2 | 5/2018 | Ravindran et al. |
| 10,114,917 | B1 | 10/2018 | Venkataramani et al. |
| 10,181,003 | B1 | 1/2019 | Lavallee et al. |
| 10,628,546 | B1 * | 4/2020 | Colwell ............... G06F 30/27 |
| 10,699,051 | B1 * | 6/2020 | Zhang ................ G06F 30/392 |
| 10,846,453 | B1 | 11/2020 | Castle |
| 10,867,091 | B1 | 12/2020 | Oh et al. |
| 10,915,811 | B1 | 2/2021 | Ando et al. |
| 11,003,826 | B1 * | 5/2021 | Dasasathyan ......... G06F 30/392 |
| 11,036,907 | B2 | 6/2021 | Boutobza et al. |
| 2013/0179142 | A1 | 7/2013 | Kim et al. |
| 2018/0307790 | A1 * | 10/2018 | Chuang ............... G06N 3/08 |
| 2019/0012170 | A1 | 1/2019 | Qadeer et al. |
| 2019/0012424 | A1 * | 1/2019 | Brookshire ........... G06F 30/398 |
| 2019/0213289 | A1 | 7/2019 | Baeckler et al. |
| 2019/0325092 | A1 | 10/2019 | Ren et al. |
| 2020/0026807 | A1 | 1/2020 | Sha et al. |
| 2020/0057681 | A1 | 2/2020 | Mamaghani et al. |
| 2020/0074276 | A1 | 3/2020 | Cooke et al. |
| 2021/0065441 | A1 | 3/2021 | Colbert et al. |
| 2021/0097220 | A1 | 4/2021 | Bhunia et al. |
| 2021/0150373 | A1 | 5/2021 | Crouse et al. |
| 2021/0287120 | A1 | 9/2021 | Mamidi et al. |
| 2022/0004900 | A1 * | 1/2022 | Salahuddin ............. G06F 30/27 |
| 2022/0138381 | A1 * | 5/2022 | Yamane ............... G06F 30/392 |
| | | | 716/110 |

OTHER PUBLICATIONS

Karpe Nachiket et al: "Driving Timing Convergence of FPGA Designs through Machine Learning and Cloud Computing" Proceedings of the 23rd IEEE Annual International Symposium on Field-Programmable Custom Computing Machines, May 2, 2015, pp. 119-126.

Brian Bailey: "EDA Challenges Machine Learning", Dec. 14, 2017 Retrieved from the Internet: URL:https://semiengineer.com/eda-challenges-machine-learning/ retrieved 11-0-2020.

Angnesina Anthony et al: "Improving FPGA-based Logic Emulation Systems through Machine Learning", ACM Transactions on Design Automation of Electronic Systems, vol. 25, No. 5, Jul. 5, 2020, pp. 1-20.

PCT/US2020/047686 International Search Report Written Opinion dated Feb. 5, 2021.

PCT/US2020/047686 International Preliminary Report on Patentability dated Apr. 28, 2022.

Agnesina et al.; "Reducing Compilation Effort in Commercial FPGA Emulation Systems Using Machine Learning"; 2019 IEEE/ACM International Conference on Computer-Aided Design (ICCAD); Conference Paper | Publisher: IEEE (Year: 2019).

Moura; "Where Algebra Meets Signal Processing: Generating SW/HW Implementations of Algorithms"; 2009 International Symposium on Signals, Circuits and Systems; Conference Paper | Publisher: IEEE (Year: 2009).

Kahng; "Machine Learning Applications in Physical Design: Recent Results and Directions"; ISPD '18: Proceedings of the 2018 International Symposium on Physical Design. Mar. 2018, pp. 68-73• https://doi.org/10.1145/3177540.3177554 (Year: 2018).

Noronha et al.; "LeFlow: Automatic Compilation ofTensorFlow Machine Learning Applications to FPGAs"; FSP Workshop 2018; Fifth International Workshop on FPGAs for Software Programmers; Conference Paper | Publisher: VDE (Year: 2018).

Kousanakis et al.; "An Architecture for the Acceleration of a Hybrid Leaky Integrate and Fire SNN on the Convey HC-2ex FPGA-Based Processor"; 2017 IEEE 25th Annual International Symposium on Field-Programmable Custom Computing Machines ( FCCM); Conference Paper | Publisher: IEEE (Year: 2017).

Li et al.; "Heterogeneous Systems with Reconfigurable Neuromorphic Computing Accelerators"; 2016 IEEE International Symposium on Circuits and Systems (ISCAS); Conference Paper | Publisher: IEEE (Year: 2016).

* cited by examiner

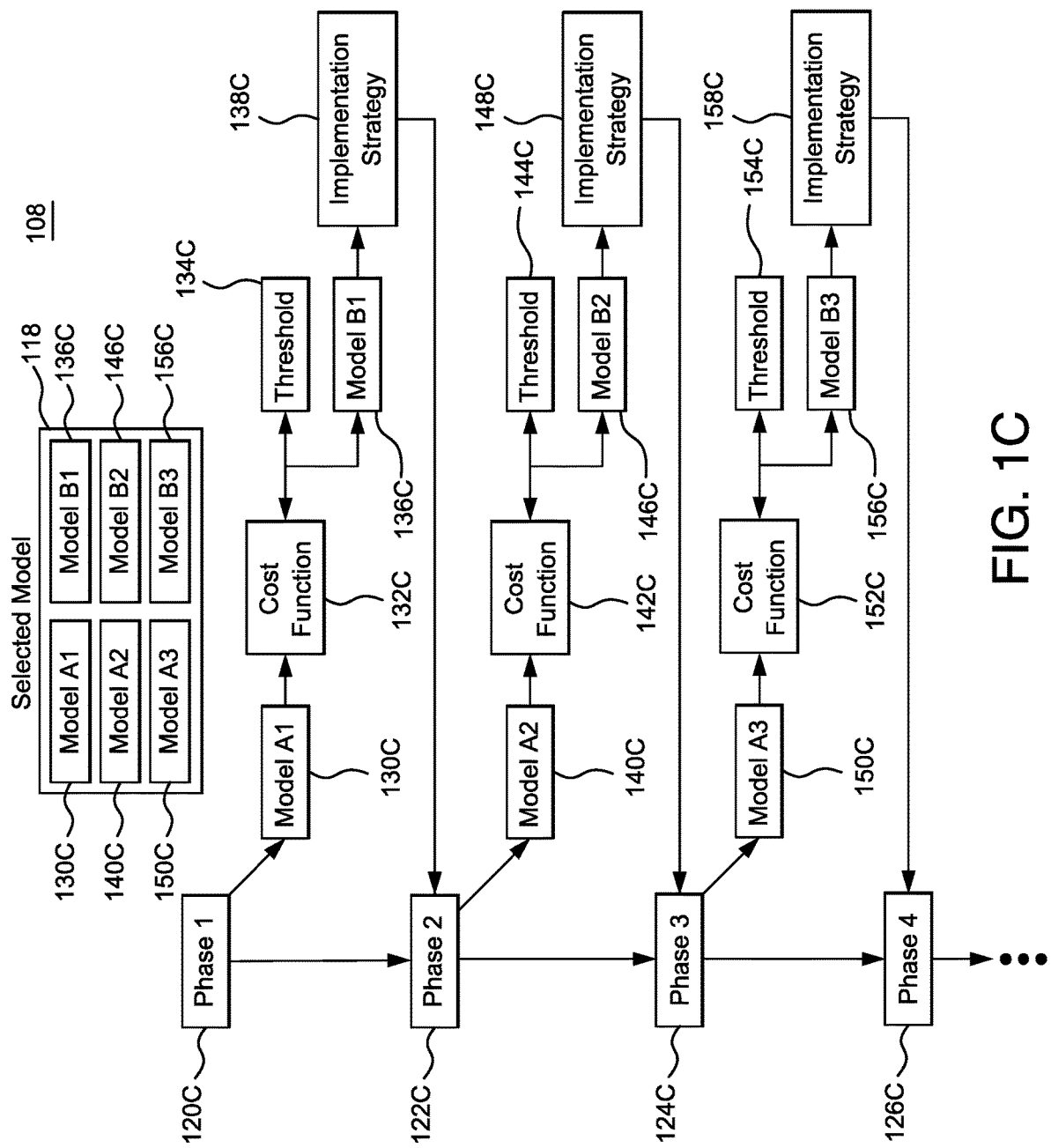

MACHINE-LEARNING ENHANCED COMPILER

RELATED APPLICATION AND CLAIM OF PRIORITY

This application is a continuation of U.S. patent application Ser. No. 16/992,636 filed Aug. 13, 2020, which claims priority to Application No. EP19204152.3 filed Oct. 18, 2019 and titled "METHOD AND APPARATUS FOR INTEGRATING MACHINE LEARNING BASED TECHNIQUES TO IMPROVE COMPILATION OF FPGA BASED EMULATION AND PROTOTYPING SYSTEMS," which are incorporated herein by reference.

TECHNICAL FIELD

The present disclosure relates to compilers used in the design of circuits or electrical components.

BACKGROUND

Designs for circuits or electrical components are programmed and compiled (e.g., for verification purposes). Program code for the designs can be written and compiled to create virtual circuits or electrical components. For example, code for designs may be compiled to simulate one or more field programmable gate arrays (FPGAs) that perform the operation of the designs. Test signals may then be sent through the virtual circuits or electrical components to test the designs.

SUMMARY

In one embodiment, a method includes generating a netlist for a circuit design and predicting, by applying a first machine learning model to the netlist, a first compile time for the circuit design. The method also includes predicting by applying a second machine learning model to the netlist, a first place and route strategy based on the first compile time. The method further includes adjusting a logic of the circuit design in accordance with the first place and route strategy.

The method includes may include predicting, by applying a third machine learning model to the adjusted logic, a second compile time for the circuit design and predicting, by applying a fourth machine learning model to the adjusted logic, a second place and route strategy based on the second compile time. The method may further include placing components of the circuit design in accordance with the second place and route strategy.

The method may include predicting, by applying a fifth machine learning model to the placed components, a third compile time for the circuit design and predicting, by applying a sixth machine learning model to the placed components, a third place and route strategy based on the third compile time. The method may also include routing the components in accordance with the third place and route strategy.

The method may include generating a bitstream in accordance with the routing of the components.

In some instances, the first and second machine learning models are part of a base model generated using base data and the base model was selected from a group that includes the base model, a tuned model generated using training data generated by compiling a plurality of circuit designs, and a hybrid model generated using the training data and the base data.

The method may include selecting the base model in response to a determination that a first distance between the netlist and the circuit design is less than a second distance between the netlist and the training data used to generate the tuned model and a third distance between the netlist and the training data and the base data used to generate the hybrid model.

The method may include determining the first distance by applying a first weight to a distance between a first feature in the netlist and a first feature in the base data to produce a first weighted distance, applying a second weight to a distance between a second feature in the netlist and a second feature in the base data to produce a second weighted distance, and summing the first weighted distance and the second weighted distance.

The method may include launching a separate compilation of the circuit design. Adjusting the logic of the circuit design in accordance with the first place and route strategy occurs in the separately launched compilation.

In another embodiment, a method includes storing a base model generated using base data, receiving training data generated by compiling a plurality of circuit designs, and generating, using the training data, a tuned model. The method also includes generating, using the training data and the base data, a hybrid model, receiving a selected cost function, and biasing the base model, the tuned model, and the hybrid model using the selected cost function.

In some instances, the cost function is selected from a plurality of cost functions that include a first cost function that biases towards reducing compilation time, a second cost function that biases towards reducing resource consumption during compilation, and a third cost function that biases towards both reducing compilation time and reducing resource consumption during compilation.

The method may include generating a netlist for a circuit design and predicting, by applying a first machine learning model to the netlist, a first compile time for the circuit design. The method may also include predicting, by applying a second machine learning model to the netlist, a first place and route strategy based on the first compile time. The method may further include adjusting a logic of the circuit design in accordance with the first place and route strategy.

The method may include predicting, by applying a third machine learning model to the adjusted logic, a second compile time for the circuit design and predicting, by applying a fourth machine learning model to the adjusted logic, a second place and route strategy based on the second compile time. The method may also include placing components of the circuit design in accordance with the second place and route strategy.

The method may include predicting, by applying a fifth machine learning model to the placed components, a third compile time for the circuit design and predicting, by applying a sixth machine learning model to the placed components, a third place and route strategy based on the third compile time. The method may also include routing the components in accordance with the third place and route strategy.

The method may include generating a bitstream in accordance with the routing of the components.

The method may include selecting the base model in response to a determination that a first distance between the netlist and the circuit design is less than a second distance between the netlist and the training data used to generate the tuned model and a third distance between the netlist and the training data and the base data used to generate the hybrid model.

In another embodiment, an apparatus includes a memory and a hardware processor communicatively coupled to the memory. The hardware processor receives an instruction to compile a circuit design and in response to the instruction, generates a netlist for the circuit design. The hardware processor also predicts, by applying a first machine learning model to the netlist, a first compile time for the circuit design. The hardware processor further predicts, by applying a second machine learning model to the netlist, a first place and route strategy based on the first compile time and adjusts a logic of the circuit design in accordance with the first place and route strategy.

The hardware processor may predict, by applying a third machine learning model to the adjusted logic, a second compile time for the circuit design and predict, by applying a fourth machine learning model to the adjusted logic, a second place and route strategy based on the second compile time. The hardware processor may also place components of the circuit design in accordance with the second place and route strategy.

The hardware processor may predict, by applying a fifth machine learning model to the placed components, a third compile time for the circuit design and predict, by applying a sixth machine learning model to the placed components, a third place and route strategy based on the third compile time. The hardware processor may also route the components in accordance with the third place and route strategy.

The hardware processor may generate a bitstream in accordance with the routing of the components.

In some instances, the first and second machine learning models are part of a base model generated using base data and the base model was selected from a group that includes the base model, a tuned model generated using training data generated by compiling a plurality of circuit designs, and a hybrid model generated using the training data and the base data.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 1C illustrates a compiler device of the example system of FIG. 1A;

DETAILED DESCRIPTION

Figure 1A:
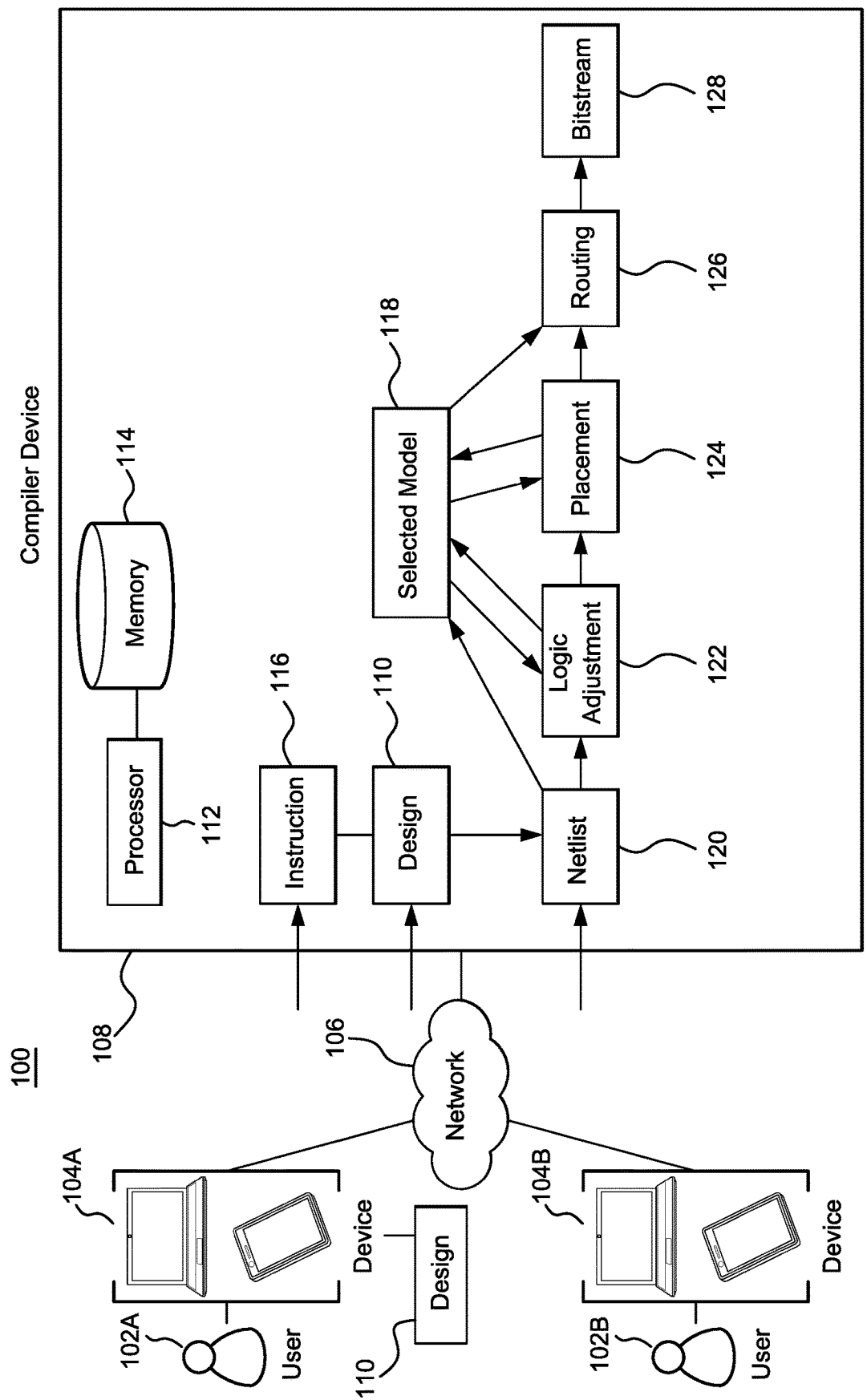
FIG. 1A illustrates an example system for compiling designs for circuits and/or electrical components.

Aspects of the present disclosure relate to a machine-learning enhanced compiler. As discussed previously, designs for circuits or electrical components are programmed and compiled to create virtual circuits or electrical components (e.g., for verification purposes). For example, code for a design may be compiled to simulate one or more FPGAs that perform the operation of the design. Test signals may then be used to test the designs.

Compilation may be a very time-intensive and/or resource-intensive task. It may take a long time to compile the program code for complicated designs, and compiling this code may use a large amount of computing resources (e.g., processor, memory, and/or network resources). When a project includes code for many different components, compilation may take a long time (e.g., greater than ten hours). In some instances, a compiler may not even have sufficient resources available to perform the compilation, resulting in failure.

For example, FPGA-based prototyping and emulation platforms (FPEPs) are used by verification teams to emulate and prototype their ASIC designs. In the prototyping flow, they deliver a working model of their design for firmware/library development, and in the emulation flow, they probe/force data on wires/registers and troubleshoot/debug the "live" design. Various compilers in the market help map these designs on to the FPEPs.

These compilers perform many steps such as front-end synthesis, technology mapping, instrumentation, partitioning, system-level place and route, FPGA compile, and debug database generation. When there is a change or a fix in the register transfer level (RTL)/gate-level input, a user recompiles a design using these compilers. Reducing compilation time is important to achieve faster turn-around of design fixes and verification sign-off.

One of the most common reasons for long compile time is the netlist congestion within the FPGA devices. The upstream partitioning tools partition logic into FPGAs based on the logic capacity of the FPGA devices on the FPEPs. They do not take into account the routability of the logic inside the FPGAs, which is impacted by various factors such as layout of resources on the FPGA devices, connectivity of the netlist, input output (TO) locations, and placement forces that act on the cells within the FPGA devices. This oversight may lead to post-placement congestion within FPGAs slowing down (sometimes greater than twelve hours) the vendor routing tools or even leading to un-routable designs.

This disclosure provides a compiler that applies machine learning techniques to reduce compile time and resource consumption. Generally, the compiler applies a machine learning model at different phases of a compilation to predict whether changes should be made to reduce compilation time or resource consumption. For example, the model may be first applied during a phase to predict a compilation time. If the compilation time exceeds a threshold (e.g., the predicted compilation time may be compared to a threshold or the predicted compilation time may fall within a time range or category defined by certain thresholds), the model may then be applied to predict a placement and routing strategy that reduces compilation time and/or resource consumption. The predicted placement and routing strategy may then be applied to subsequent phases. In this manner, the compiler reduces the duration and resource consumption of a compile process, in certain embodiments. A practical application of the compiler is that the compiler applies machine learning techniques to reduce the time it takes to compile designs and/or to reduce the resources consumed in compiling designs.

Additionally, in certain embodiments, the compiler also trains additional machine learning models that can be selected for use. For example, the compiler may train three models: (1) a base model that is generated using base data; (2) a tuned model that is generated using training data from a client site; and (3) a hybrid model that is generated using the base data and the training data. The compiler selects at runtime the model that is most suitable for compiling a particular design. The compiler is described in more detail using FIGS. 1 through 9.

FIG. 1A illustrates an example system 100 for testing designs for circuits and/or electrical components. As seen in FIG. 1A, system 100 includes one or more devices 104, a network 106, and a compiler device 108. Generally, system 100 applies one or more machine learning models to enhance the compilation of particular designs. In certain embodiments, system 100 reduces the compile time and/or the resources consumed when compiling designs.

Users 102 use one or more devices 104 to interact with other components of system 100. For example, a user 102 may use a device 104 to create a design 110 for a circuit or an electrical component. In the example of FIG. 1A, user 102A uses one or more devices 104A to create a design 110. Users 102 may then use devices 104 to communicate the designs 110 to compiler device 108 for compilation. In the example of FIG. 1A, user 102A may use a device 104A to communicate design 110 to compiler device 108. Device 104 may receive updates for the compilation from compiler device 108. For example, device 104 may be alerted by compiler device 108 if the compilation is successful or unsuccessful. Moreover, device 104 may receive messages from compiler device 108 indicating how long the compilation is taking and the amount of resources consumed during compilation.

Designs 110 may be for any suitable circuit or electrical component. For example, designs 110 may be for integrated circuits, FPGAs, hardware processors, memory arrays, and a system on chip. Compiler device 108 may be configured to compile each of these designs 110.

Devices 104 include any appropriate device for communicating with components of system 100 over network 106. As an example and not by way of limitation, device 104 may be a computer, a laptop, a wireless or cellular telephone, an electronic notebook, a personal digital assistant, a tablet, or any other device capable of receiving, processing, storing, and/or communicating information with other components of system 100. Device 104 may also include a user interface, such as a display, a microphone, keypad, or other appropriate terminal equipment usable by user 102. Device 104 may include a hardware processor, memory, and/or circuitry configured to perform any of the functions or actions of device 104 described herein. For example, a software application designed using software code may be stored in the memory and executed by the processor to perform the functions of device 104.

Network 106 allows communication between and amongst the various components of system 100. For example, user 102 may use devices 104 to communicate over network 106. This disclosure contemplates network 106 being any suitable network operable to facilitate communication between the components of system 100. Network 106 may include any interconnecting system capable of transmitting audio, video, signals, data, messages, or any combination of the preceding. Network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Compiler device 108 applies machine learning techniques to enhance the compilation of designs. In particular embodiments, compiler device 108 reduces the amount of time it takes to compile a design and/or reduces the amount of resources consumed during compilation by applying machine learning techniques to predict appropriate placement and route strategies during certain phases of compilation. In the example of FIG. 1A, compiler device 108 includes a processor 112 and a memory 114, which may be configured to perform any of the functions or actions of compiler device 108 described herein. Compiler device 108 may be embodied in any suitable number of physical devices. For example, compiler device 108 may be embodied in a single computer or server. To expand the computing resources available to compiler device 108, compiler device 108 may be distributed across multiple computers or severs, containing multiple processors 112 and memories 114.

Processor 112 is any electronic circuitry, including, but not limited to microprocessors, application specific integrated circuits (ASIC), application specific instruction set processor (ASIP), and/or state machines, that communicatively couples to memory 114 and controls the operation of compiler device 108. Processor 112 may be 8-bit, 16-bit, 32-bit, 64-bit or of any other suitable architecture. Processor 112 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 112 may include other hardware that operates software to control and process information. Processor 112 executes software stored on memory to perform any of the functions described herein. Processor 112 controls the operation and administration of compiler device 108 by processing information received from devices 104, network 106, and memory 114. Processor 112 may be a programmable logic device, a microcontroller, a microprocessor, any suitable processing device, or any suitable combination of the preceding. Processor 112 is not limited to a single processing device and may encompass multiple processing devices.

Memory 114 may store, either permanently or temporarily, data, operational software, or other information for processor 112. Memory 114 may include any one or a combination of volatile or non-volatile local or remote devices suitable for storing information. For example, memory 114 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 114, a disk, a CD, or a flash drive. In particular embodiments, the software may include an application executable by processor 112 to perform one or more of the functions described herein.

As mentioned previously, compiler device 108 compiles designs 110 communicated by devices 104 and applies machine learning techniques during compilation to improve the compilation process. Generally, the compilation process includes several phases that will be described in FIGS. 1A, 1B, and 2. Further details of the compilation process are described using FIG. 7.

The compilation process begins when compiler device 108 receives a design 110 and an instruction 116 to compile the design 110. Design 110 and instruction 116 may have been communicated by a user 102 and/or device 104. Design 110 may be for any suitable circuit or electrical component (e.g., an integrated circuit, FPGA, hardware processor, memory array, system on chip, etc.). In response to receiving the design 110 and/or instruction 116, compiler device 108 selects a machine learning model 118 to apply to the compilation of design 110. Compiler device 108 may select a different machine learning model 118 to apply to different phases of the compilation. The training of the selected model(s) 118 will be described using FIGS. 3 and 4. The selection of model(s) 118 will be described using FIGS. 5 and 6. In certain embodiments, by applying selected model 118 to the compilation of the design 110, compiler device 108 reduces the compilation time and the resources consumed during compilation.

In one embodiment, compilation is a process that includes several different phases. At each phase, a selected model 118 may be applied to determine whether changes should be made to improve compilation time and/or resource consumption. Different models 118 may be selected and applied during different phases of the compilation. Generally, the phases of compilation include generating a netlist 120, logic adjustment 122, placement 124, and routing 126. In one embodiment, these phases occur in sequence. Compiler device 108 may apply selected model 118 during one or more of these phases.

Netlist 120 includes a listing of the components of a design and a listing of the connections between the components. Netlist 120 generally includes a listing of the components in design 110 and a listing of the connections between these components. Netlist 120 thus provides a picture of the structure of design 110. During logic adjustment 122, the logic in the design is adjusted to optimize the structure and its flow. During placement 124, compiler device 108 places virtual components into a virtual design to emulate the design described by netlist 120. During routing 126, the placed components are connected to one another to emulate the design described in netlist 120. After routing 126 is complete, test signals may be sent through the virtual design to generate a bitstream 128. A user 102 or verification software may then validate the bitstream 128 to determine whether the design is operating as intended.

During certain phases of compilation, compiler device 108 applies a selected model 118 to determine whether adjustments should be made to improve certain aspects of the compilation (e.g., compilation time, resource consumption, power consumption, efficiency, heat generation, and timing). For example, a selected model 118 may be applied to the features in netlist 120 to determine whether the model 118 should be applied during logic adjustment 122. If model 118 should be applied during logic adjustment 122, then model 118 is applied to determine a place and route strategy to apply during logic adjustment 112. Logic adjustment 122 is then performed in accordance with this place and route strategy.

Likewise, a selected model 118 may be applied to the adjusted logic to determine whether the model 118 should be applied during placement 124. If the model 118 should be applied during placement 124, then the model 118 is applied to determine a place and route strategy to apply during placement 124. Placement 124 is then performed in accordance with this place and route strategy.

Similarly, a selected model 118 may be applied to the placed components to determine whether the model 118 should be applied during routing 126. If the model 118 should be applied during routing 126, then the model 118 is applied to determine a place and route strategy to apply during routing 126. Routing 126 is then performed in accordance with this place and route strategy.

Figure 1B:
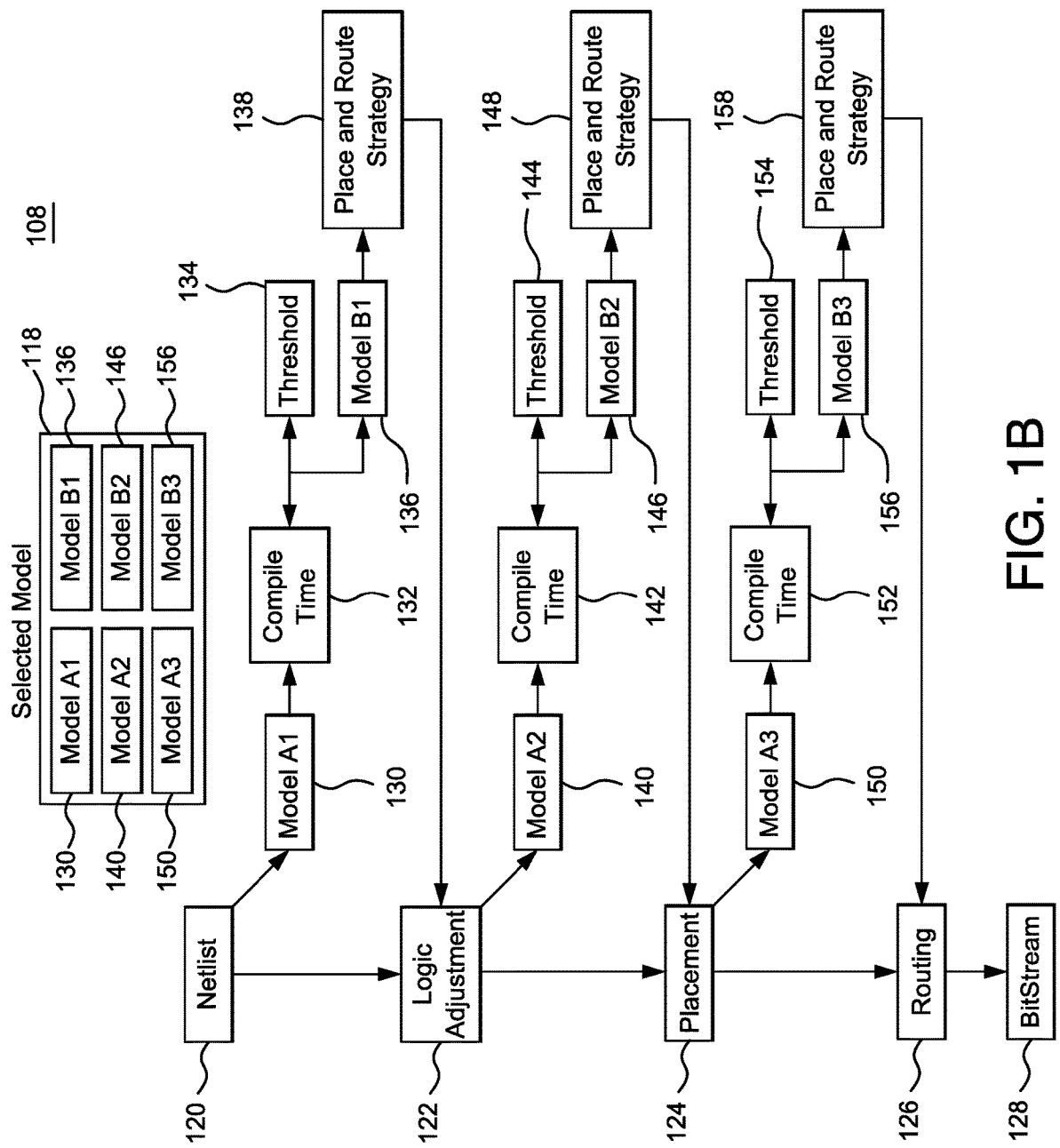
FIG. 1B illustrates a compiler device of the example system of FIG. 1A.

FIG. 1B provides further details of how compiler device 108 applies model(s) 118 during compilation. During certain phases of compilation, compiler device 108 applies a selected model 118 to determine whether adjustments should be made to improve certain aspects of the compilation (e.g., compilation time, resource consumption, power consumption, efficiency, heat generation, and timing). As seen in FIG. 1B, a selected model 118 may include several different models (model A1 130, A2 140, A3 150, B1 136, B2 146, and B3 156) that can be applied during different phases of the compilation.

As an example, after netlist 120 is generated, compiler device 108 may select a model 118 to apply to the features of netlist 120. Compiler device 108 then applies model A1 130 of the selected model 118 to netlist 120. Model A1 130 may be a portion of selected model 118 that, when applied, predicts a compile time 132 based on the features in netlist 120 (e.g., number of look up tables, number of registers, number of flip flops, number of input/output connections, number of memories, estimated routing congestion). Compiler device 108 analyzes the predicted compile time 132 to determine whether changes should be made at this point to improve the compilation. Compiler device 108 may compare compile time 132 to a threshold 134 to determine whether changes should be made. In certain embodiments, compiler device 108 may determine whether compile time 132 exceeds threshold of 134. In some embodiments, compiler device 108 may determine that compile time 132 falls within a time range or category defined by threshold 134. If compile time 132 exceeds threshold 134 or if compile time 132 falls within a time range that is deemed too high, compiler device 108 may determine that changes should be made. In response, compiler device 108 applies model B1 136 of the selected model 118 to netlist 120 to predict a place and route strategy 138. Model B1 136 may be a portion of the selected model 118 that analyzes features of netlist 120 (e.g., number of look up tables, number of registers, number of flip flops, number of input/output connections, number of memories, estimated routing congestion) to predict a place and route strategy 138 for adjusting the logic of design 110. Place and route strategy 138 may reduce the amount of time it takes and/or the resources consumed to adjust the logic. Compiler device 108 may apply place and route strategy 138 to logic adjustment 122.

If compile time 132 does not exceed threshold 134 or if compile time 132 falls within a time range or category that is not deemed too high, then compiler device 108 may proceed to logic adjustment 122 without applying model B1 136 to netlist 120. Stated differently, if compile time 132 is not too high, then compiler device 108 may proceed to logic adjustment 122 without making changes to the compilation process.

Compiler device 108 then applies a selected model 118 during logic adjustment 122. As discussed previously, the model 118 selected during logic adjustment 122 may not be the same model 118 selected for netlist 120. The difference in model selection may be attributed to features in netlist 120 changing during logic adjustment 122 and/or new features being introduced during logic adjustment 122. After model 118 is selected, compiler device 108 applies model A2 140 of the selected model 118 during logic adjustment 122 to predict compile time 142. Compile time 142 may be different from compile time 132 because the logic in the design was adjusted during logic adjustment 122 and/or because model A2 140 analyzes features of the adjusted logic (e.g., number of look up tables, number of registers, number of flip flops, number of input/output connections, number of memories, estimated routing congestion) rather than features of netlist 120. Some of these features may have changed during logic adjustment 122. Additionally, some of these features may be introduced during logic adjustment 122 but were unavailable in the original netlist 120. Compiler device 108 compares compile time 142 to threshold 144 to determine whether changes should be made at this point of compilation. If compile time 142 exceeds threshold 144 or if compile time 142 falls within a time range or category that is deemed too high, then compiler device 108 applies model B2 146 of the selected model 118 to the adjusted logic to predict place and route strategy 148. Model B2 146 may be a portion of selected model 118 that analyzes features of the adjusted logic (e.g., number of look up tables, number of registers, number of flip flops, number of input/output connections, number of memories, estimated routing congestion) to predict the place and route strategy 148 for placing components of the adjusted logic. For example, model B2 146 may predict the place and route strategy 148 that best reduces compilation time and/or resources consumed when placing components of the virtual design. Compiler device 108 applies place and route strategy 148 during placement 124 to adjust the placement of components in the virtual design.

If compile time 142 does not exceed threshold 144 or if compile time 142 falls into a time range or category that is not deemed too high, then compiler device 108 may continue the compilation process without applying model B2 146. Stated differently, if compiler device 108 determines that compile time 142 is not too high, then compiler device 108 may proceed to placement 124 without making changes to the compilation process.

During placement 124, compiler device 108 places components of the virtual design. Compiler device 108 then applies a selected model 118 during placement 124. As discussed previously, the model selected during placement 124 may not be the same as the model selected during logic adjustment 122 or for netlist 120. The difference in model selection may be attributed to features changing during placement 124 and/or new features being introduced during placement 124. Compiler device 108 applies model A3 150 of the selected model 118 to the placed components in the virtual design to predict a compile time 152. Model A3 150 may be a portion of selected model 118 that analyzes features of the placed components (e.g., number of look up tables, number of registers, number of flip flops, number of input/output connections, number of memories, estimated routing congestion) to predict compile time 152. Some of these features may have changed during placement 124. Additionally, some of these features may be introduced during placement 124 but were unavailable in the original netlist 120 and during logic adjustment 122. Compiler device 108 compares compile time 152 with threshold 154 to determine whether additional changes should be made to the routing of components in design 110. If compile time 152 exceeds threshold 154, compiler device 108 applies model B3 156 of the selected model 118 to the placed components in the virtual design. In certain embodiments, compiler device 108 determines that compile time 152 exceeds threshold 154 by determining that compile time 152 falls within a time range or category defined by threshold 154 that is deemed too high. Model B3 156 may be a portion of selected model 118 that analyzes features of the placed components (e.g., number of look up tables, number of registers, number of flip flops, number of input/output connections, number of memories, estimated routing congestion) to predict place and route strategy 158. Place and route strategy 158 may be a strategy for routing the placed components that reduces compile time and/or resource consumption during routing 126. Compiler device 108 may apply place and route strategy 158 to routing 126.

If compile time 152 does not exceed threshold 154, compiler device 108 proceeds to routing 126 without applying model B3 156. Stated differently, if compiler device 108 determines that the predicted compile time 152 is not too high, then compiler device 108 proceeds to routing 126 without making adjustments to the compilation process.

Compiler device 108 performs routing 126 to route the placed components in the virtual design. Compiler device 108 may perform routing 126 based on place and route strategy 158 if model B3 156 was applied. After compiler device 108 completes routing 126, compiler device 108 sends test signals through the virtual design to generate bitstream 128. A user 102 and/or a verification program then validates bitstream 128 to determine whether the virtual design is operating as intended.

In certain embodiments, compiler device 108 launches compilation processes that are separate from the original compilation process when it is determined that a compile time 132, 142, or 152 exceeds a threshold 134, 144, or 154. For example, if compiler device 108 determines that compile time 132 exceeds threshold 134, compiler device 108 may launch a separate compilation process that performs logic adjustment 122 based on place and route strategy 138. The original compilation process may proceed to logic adjustment 122 without applying place and route strategy 138. As a result, two separate compilation processes may proceed in parallel. Later on in the process, if compile time 142 exceeds threshold 144, then compiler device 108 may again launch a separate compilation process that applies place and route strategy 148 during placement 124. The original compilation process may continue to placement 124 without applying place and route strategy 148. As a result, three separate compilation processes may be proceeding in parallel. Stated differently, if compile time 132 exceeds threshold 134, or if compile time 142 exceeds threshold 144, or compile time 152 exceeds threshold 154, compiler device 108 may launch a separate compilation process at the point where the compile time 132, 142, or 152 exceeds threshold 134, 144, or 154. Compiler device 108 may then apply the corresponding place and route strategy 138, 148, or 158 in the separately launched compilation process.

In some embodiments, if compile time 142 does not exceed threshold 144 in the original compilation process or the separately launched compilation process, then the separately launched compilation process is stopped or terminated. As a result, if compile time 142 does not exceed threshold 144, compiler device 108 may deem separately launched compilation processes to be unnecessary and stop those processes. The original compilation process may then proceed. In some embodiments, when a separately launched compilation process completes, all remaining compilation processes may be stopped or terminated. In this manner, compiler device 108 considers many different compilation strategies in parallel and uses the results from the compilation that finishes the fastest.

FIG. 1C illustrates how compiler device 108 may be used to improve the compilation process in any general Electronic Design Automation (EDA) process. As seen in FIG. 1C, compilation during the EDA process may include several phases 120C, 122C, 124C, and 126C. These phases 120C, 122C, 124C, and 126C occur in sequence. In the example of FIG. 1B, these phases were netlist 120, logic adjustment 122, placement 124, and routing 126. Compiler device 108 may select a model 118 to apply during one or more phases 120C, 122C, 124C, and 126C of the compilation process. Similar to the example of FIG. 1B, the selected model(s) 118 include models A1 130C, A2 140C, A3 150C, B1 136C, B2 146C, and B3 156C. Model(s) 118 may include even more models to accommodate compilation processes with more phases.

Similar to the example of FIG. 1B, compiler device 118 may select a model 118 during a first phase 120C and apply Model A1 130C of the selected model 118 to features during the first phase 120C to predict a particular cost function 132C that indicates a preference of a user (e.g., compile time, resource consumption, efficiency, power consumption, heat generation, etc.). This predicted cost function 132C may then be compared to a threshold 134C to determine whether model B1 136C of the selected model 118 should be applied to predict an implementation strategy 138C. If model B1 136C is applied, then implementation strategy 138C is predicted and applied to a second phase 122C. If not, then the compilation process proceeds to the second phase 122C.

This process repeats for the second phase 122C, third phase 124C, and so forth as needed. For example, during each of these phases, a model 118 may be selected based on features during these phases. A model A (e.g., model A2 140C or A3 150C) may be applied to predict a cost function (e.g., cost function 142C or 152C). That cost function is compared to a threshold (e.g., threshold 144C or 154C) to determine whether a model B (e.g., model B2 146C or 156C) should be applied to predict an implementation strategy (e.g., implementation strategy 148C or 158C). If the model B is applied, then the implementation strategy is predicted and applied to the subsequent phase. If not, then the compilation process proceeds to the subsequent phase.

Figure 2:
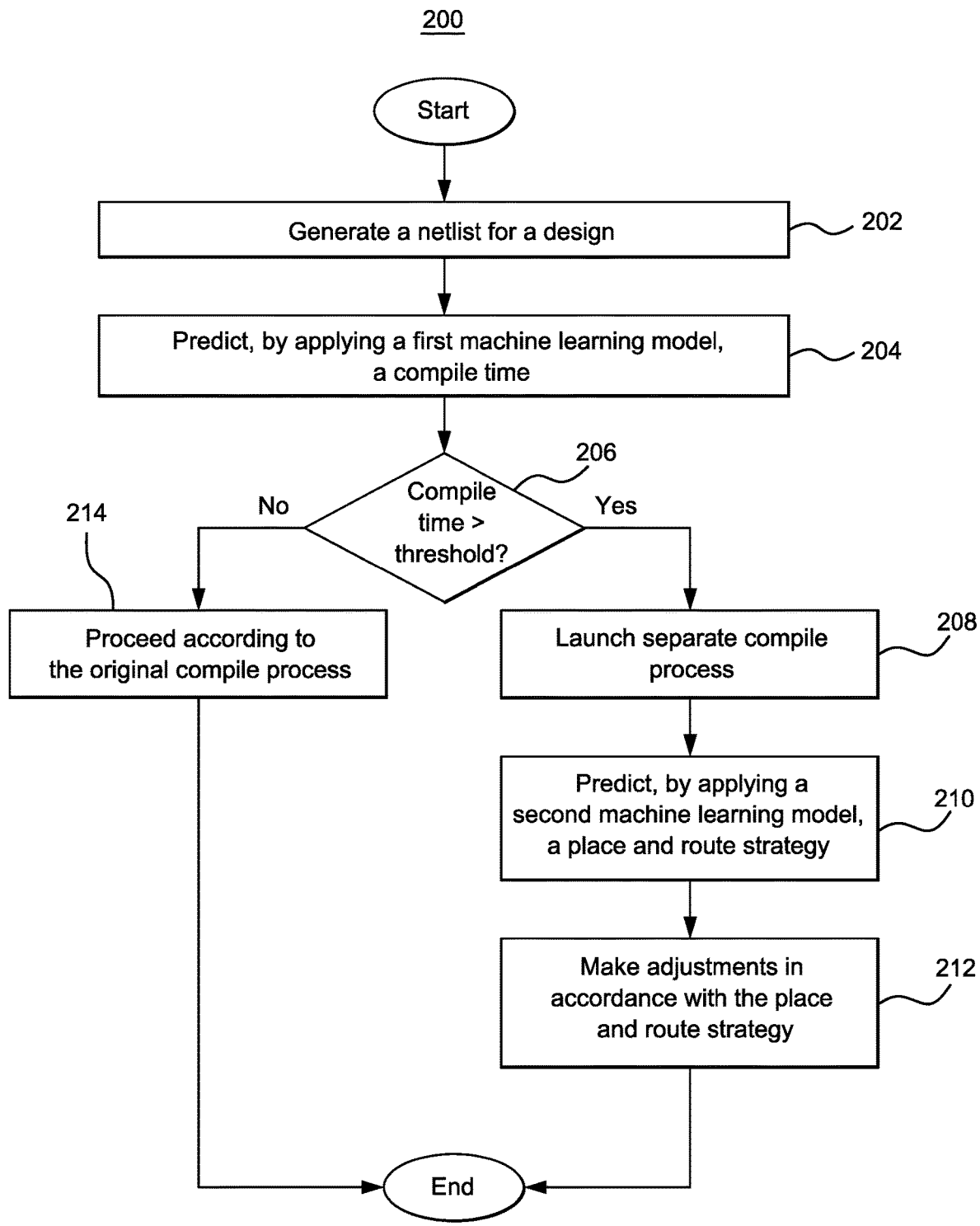
FIG. 2 illustrates a flowchart of a process for compiling a design in the example system of FIG. 1A.

FIG. 2 illustrates a flowchart of a process 200 for compiling a design in the example system 100 of FIGS. 1A, 1B, and/or 1C. Generally, compiler device 108 performs process 200. In particular embodiments, compiler device 108 reduces compilation time and/or resources consumed during compilation by performing process 200.

Compiler device 108 begins by generating a netlist 120 for a design 110 in 202. The design may be for a circuit or an electrical component such as for example an FPGA design. The netlist 120 lists the components of the design and the connections between these components. Compiler device 108 may analyze netlist 120 to determine whether adjustments should be made during the compilation process.

In 204, compiler device 108 predicts, by applying a first machine learning model 130, a compile time 132, 142, or 152. The first machine learning model (e.g., models A1 130, A2 140, or A3 150 in FIG. 1B) may be designed to predict a compile time based on features in netlist 120, features of the adjusted logic of design 110, or features of the placed components of design 110.

In 206, compiler device 108 determines whether compile time 132, 142, or 152 exceeds a threshold 134, 144, or 154. Compiler device 108 may compare compile time 132, 142, or 152 to threshold 134, 144, or 154 to make this determination. In some embodiments, compiler device 108 determines whether compile time 132, 142, or 152 falls within a time range or category defined by threshold 134, 144, or 154 that is deemed too high. If the compile time 132, 142, or 152 does not exceed threshold 134, 144, or 154, compiler device 108 proceeds according to the original compile process in 214. Stated differently, compiler device 108 proceeds to logic adjustment 122, placement 124, or routing 126 without making adjustments to the compilation process if the compile time 132, 142, or 152 is not deemed too high.

If compile time 132, 142, or 152 exceeds threshold 134, 144, or 154, compiler device 108 launches a separate compile process in 208. In certain embodiments, compiler device 108 does not perform 208. In 210, compiler device 108 predicts, by applying a second machine learning model (e.g., models B1 136, B2 146, or B3 156 in FIG. 1B), a place and route strategy 138, 148, or 158. The second machine learning model 136, 146, 156 may be designed to predict a place and route strategy 138, 148, or 158 that reduces compilation time and/or resources consumed when applied. Generally, the second machine learning model analyzes features of netlist 120, features of the adjusted logic of design 110, or features of the placed components of design 110 to predict place and route strategy 138, 148, or 158. In 212, compiler device 108 makes adjustments (e.g., adjusts logic of design 110, adjusts placement of components of design 110, or adjusts routing of components of design 110) in accordance with the place and route strategy 138, 148, or 158. Stated differently, compiler device 108 performs logic adjustment 122, placement 124, or routing 126 in accordance with place and route strategy 138, 148, or 158.

Figure 3:
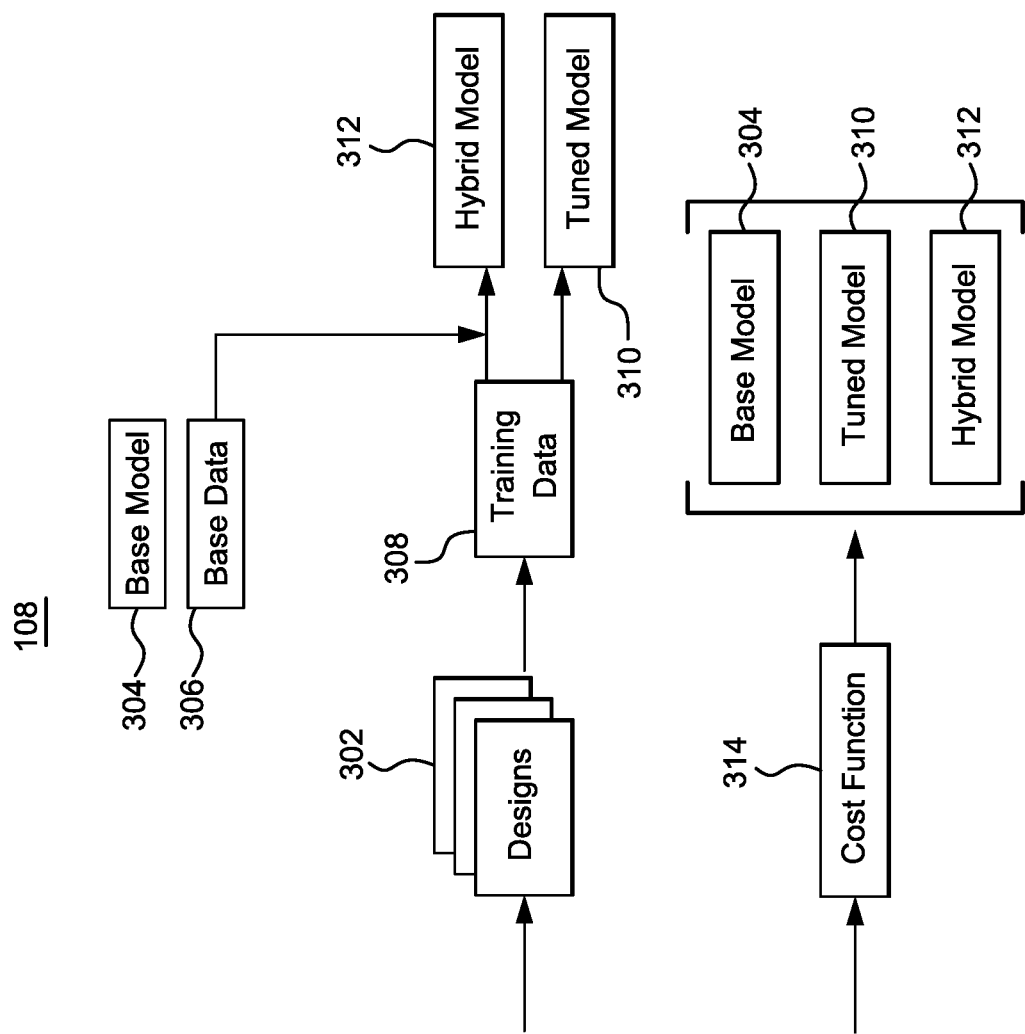
FIG. 3 illustrates model training using a compiler device of the example system of FIG. 1A.

FIG. 3 illustrates the compiler device 108 of system 100 training machine learning models. In one embodiment, the compiler device 108 uses the techniques described in FIG. 3 to generate the machine learning models used in FIGS. 1A, 1B, 1C and 2. Generally, compiler device 108 trains a group of models that can be applied during a compile process. These models may be configured to consider different types of designs. As a result, compiler device 108 can enhance the compile process for several different types of designs by selecting a different model to apply in certain embodiments.

Compiler device 108 stores a base model 304 and base data 306 (e.g., in memory 114). Base model 304 includes one or more machine learning models that were trained using base data 306. Base data 306 may be generated by compiling generic or more common designs for circuits and/or electrical components. Base model 304 may be generated by analyzing base data 306 using a machine learning technique. A manufacturer of compiler device 108 or a developer of software executing on compiler device 108 may have generated base model 304 and or base data 306 by compiling common designs. Thus, when compiler device 108 is initially set up, compiler device 108 can apply base model 304 and/or base data 306 to enhance the compilation of generic or more common designs.

Although the base model 304 can be used in the processes described in FIGS. 1B and 2, because base model 304 and base data 306 were generated using generic or more common designs, base model 304 and/or base data 306 may not be well suited for designs created by users 102. For example, the base model 304 may be a default machine learning model (or models) that is provided to a user, but the base model 304 may not suit the user's desires. Compiler device 108 may generate additional models that can be selected during compilation and that better suit the designs of the particular user 102. Compiler device 108 may receive one or more designs 302 that can be used to generate these additional models (e.g., from users 102A and 102B). These designs 302 may be for any suitable circuit or electrical component (e.g., integrated circuits, FPGAs, hardware processor, memory arrays, system on chip, etc.). These designs 302 may have been created by users 102A and 102B. Compiler device 108 may compile and/or analyze these designs 302 to train additional machine learning models that can be used to enhance compilations of subsequent designs generated by users 102A and 102B. Stated differently, designs 302 may serve as reference designs of users 102A and 102B that compiler device 108 may use to design models tailored to users 102A and 102B.

Compiler device 108 compiles and/or analyzes designs 302 to generate training data 308. Training data 308 may include information related to the structure of designs 302 and information related to the compilation and or analyses of designs 302. For example, training data 308 may identify structural elements in design 302, such as then placement and routing of components. Additionally, training data 308 may indicate the compilation times and/or the resources consumed during compilation of particular structures in designs 302. Compiler device 108 may analyze training data 308 to generate additional machine learning models that can be applied to subsequent compilations. In the example of FIG. 3, compiler device 108 analyzes training data 308 to generate a tuned model 310. Compiler device 108 also analyzes both base data 306 and training data 308 to generate a hybrid model 312. As a result, tuned model 310 may be particularly tailored to designs created by users 102A and 102B, while hybrid model 312 may take into consideration the designs created by users 102A and 102B and the generic or more common designs that compiler device 108 was initially set up to handle. These models may be applied to enhance subsequent compilations.

Compiler device 108 may bias base model 304, tuned model 310, and/or hybrid model 312 based on the preferences of users 102A and 102B. For example, users 102A and 102B may select one or more cost functions 314 that compiler device 108 uses to bias base model 304, tuned model 310, and/or hybrid model 312. These selected cost functions 314 represent particular preferences of users 102A and 102B. For example, if users 102A and 102B prefer to reduce compilation time, then users 102A and 102B may select a cost function 314 that biases towards reducing compilation time (e.g., perhaps at the cost of increasing resource consumption). As another example, if users 102A and 102B prefer to reduce resource consumption, users 102A and 102B may select a cost function 314 that biases towards reducing resource consumption (e.g., perhaps at the cost of increasing compilation time). As another example, if users 102A and 102B prefer to reduce both compilation time and resource consumption, users 102A and 102B may select a cost function 314 that balances the reduction of compilation time and resource consumption. Using the selected cost function 314, compiler device 108 may adjust base model 304, tuned model 310, and/or hybrid model 312 using the selected cost function 314 to introduce the bias into base model 304, tuned model 310 and/or hybrid model 312. In this manner, base model 304, tuned model 310, and/or hybrid model 312 may be adjusted and/or tailored to the preferences of users 102A and 102B. Users 102A and 102B may select a cost function 314 for any suitable preference of users 102A and 102B. For example, users 102A and 102B may select cost functions 314 for biasing towards power consumption, timing, efficiency, heat generation, etc.

As an example, if a user selected a cost function 314 indicating a preference for aggressively reducing compilation time, then compiler device 108 may bias base model 304, tuned model 310, and hybrid model 312 towards reducing compile time. Compiler device 108 may change model B1 136, model B2 146, and model B3 156 in these models to predict place and route strategies 138, 148, and 158 that, when implemented, try several different adjustments, placements, or routes to see which reduces compile time the most. These types of strategies may result in a reduction in compile time, but may cause resource consumption to increase during compilation. Compiler device 108 may also reduce thresholds 134, 144, and 154 so that model B1 136, model B2 146, and model B3 156 are applied more frequently to reduce compilation time.

On the other hand, if the user selected a cost function 314 indicating a preference for aggressively reducing resource consumption, then compiler device 108 may bias base model 304, tuned model 310, and hybrid model 312 towards reducing resource consumption. Compiler device 108 may change model B1 136, model B2 146, and model B3 156 in these models to predict place and route strategies 138, 148, and 158 that, when implemented, make few adjustments to the placement and routes. These types of strategies may result in a reduction in resource consumption during the compile process, but may cause the compile time to increase.

Figure 4:
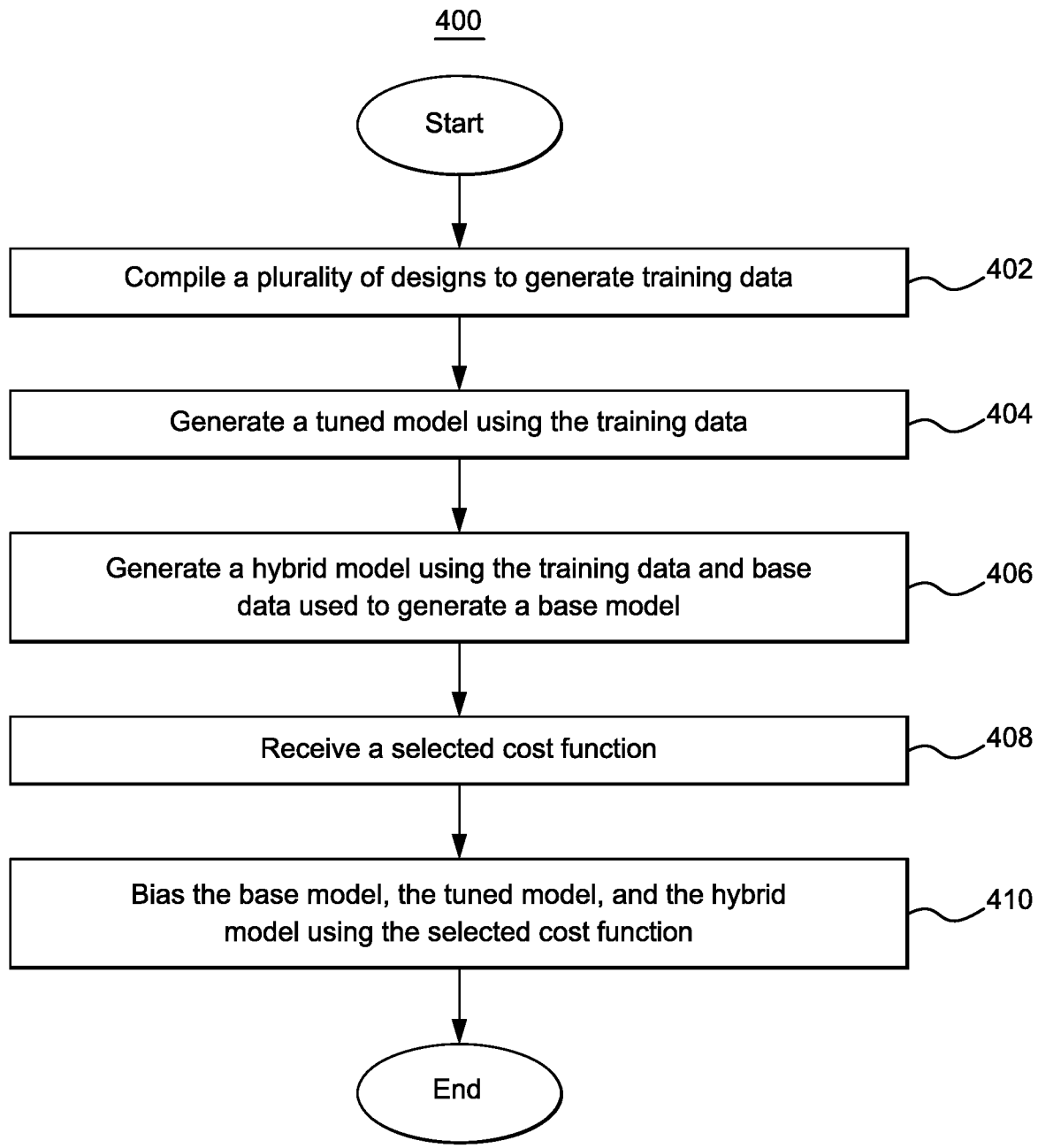
FIG. 4 illustrates a flowchart of a process for training models in the example system of FIG. 1A.

FIG. 4 illustrates a flowchart of a process 400 for training models in the example system 100 of FIG. 1A. Generally, the compiler device 108 may perform process 400 to train the models used in FIGS. 1A, 1B, 1C, 2, and 3. In particular embodiments, by performing process 400, compiler device 108 reduces the compilation time and/or resource consumption associated with compiling designs.

Compiler device 108 begins by compiling a plurality of designs 302 to generate training data 308 in 402. Designs 302 may be created by users 102A and 102B and communicated to compiler device 108. Designs 302 may be for any suitable circuit or electrical component (e.g., integrated circuits, FPGAs, hardware processors, memory arrays, etc.). Compiler device 108 may compile and/or analyze designs 302 to generate training data 308. The training data 308 may include information about the structure within designs 302 and the compilation time and/or resources consumed when compiling these structures.

In 404, compiler device 108 generates a tuned model 310 using the training data 308. As a result, tuned model 310 is designed to handle the particular designs created by users 102A and 102B. This does not mean however, that tuned model 310 is always the best model to apply to the designs of users 102A and 102B.

In 406, compiler device 108 generates a hybrid model 312 using the training data 308 and base data 306. Compiler device 108 may one or more of base model 304, tuned model 310, and/or hybrid model 312, to enhance the compilation of designs from users 102A and 102B. Base model 304 may be designed to handle generic or more common designs. Tuned model 310 may be designed to handle particular designs created by users 102A and 102B. Hybrid model 312 may be designed to consider both the generic or more common designs and the particular designs created by users 102A and 102B.

In 408, compiler device 108 receives a selected cost function 314. Cost function 314 may be selected by users 102A and or 102B based on their preferences for the compilation. For example, if users 102A and 102B prefer to reduce compilation time, then users 102A and 102B may select a cost function 314 that biases towards reducing compilation time. As another example, if users 102A and 102B prefer to reduce resource consumption during compilation, users 102A and 102B may select a cost function 314 that biases towards reducing resource consumption. Users 102A and 102B may also select a cost function 314 that balances the reduction of compilation time and resource consumption. This disclosure contemplates users 102A and 102B selecting a cost function 314 that focuses on any suitable preferences of users 102A and 102B. For example, users 102A and 102B may select a cost function 314 that addresses power consumption, efficiency, and/or heat generation, to name a few examples.

In 410, compiler device 108 biases base model 304, tuned model 310, and/or hybrid model 312 using the selected cost function 314. Compiler device 108 may adjust one or more of these models using the selected cost function 314 to skew these models towards focusing on the preferences of users 102A and 102B. As a result, when these models are applied, they will address the preferences and desires of users 102A and 102B, in particular embodiments.

Figure 5:
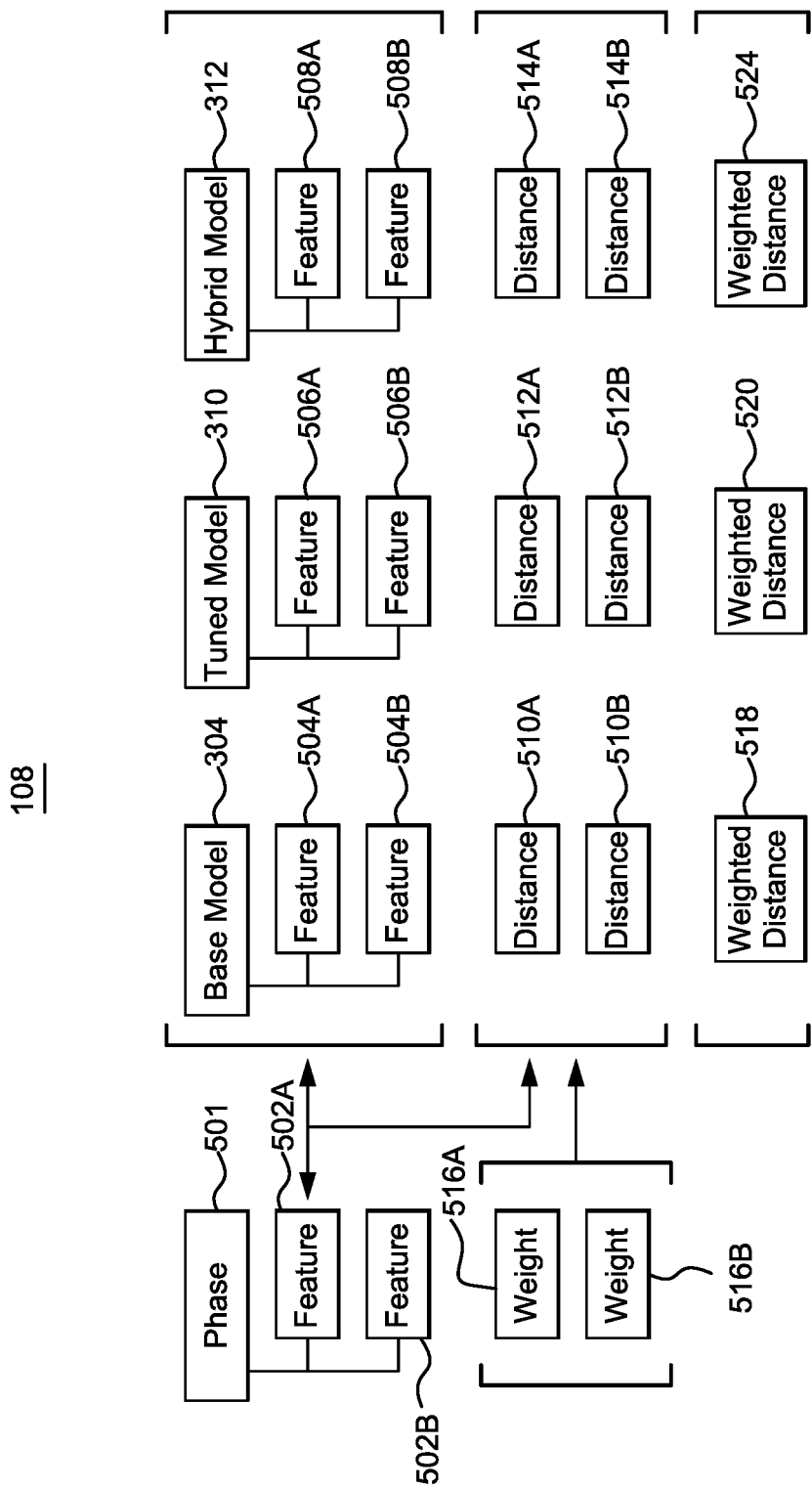
FIG. 5 illustrates model selection using a compiler device of the example system of FIG. 1A.

FIG. 5 illustrates a compiler device 108 of the example system 100 of FIG. 1A selecting a model to apply to a compilation process. In one embodiment, the compiler device 108 uses the techniques described in FIG. 5 to select the machine learning models used in FIGS. 1A, 1B, 1C, 2, 3, and 4, specifically the machine learning models selected during the different phases of a compilation process. Generally, compiler device 108 selects and applies an appropriate machine learning model to a design based on the features of that design. In particular embodiments, by selecting and applying the appropriate model to a design, compiler device 108 reduces the compile time and/or resources consumed during compilation.

As discussed previously, the compilation process begins when compiler device 108 receives an instruction 116. Instruction 116 may include an instruction to compile a particular design. Compiler device 108 receives a design 110, which may be a design for an integrated circuit, FPGA, etc. Instruction 116 may include an instruction to compile design 110. In response to instruction 116, compiler device 108 initiates the complication of design 110. The compilation process includes one or more phases 501. During each phase 501, compiler device 108 may select a model 118 to apply according to the example of FIG. 5.

For example, during a first phase 501, compiler device 108 generates a netlist 120 for design 110. Netlist 120 includes a listing of the components in design 110 and a listing of the connections between these components. Netlist 120 thus provides a picture of the structure of design 110. In particular embodiments, compiler device 108 identifies one or more features 502 of design 110 from netlist 120. For example, netlist 120 may include a listing of these features 502. As another example, compiler device 108 may determine these features 502 by analyzing the listing of components and connections in the netlist 120. In the example of FIG. 5, netlist 120 includes features 502A and 502B. This disclosure contemplates netlist 120, including any suitable number of features 502.

Compiler device 108 then selects a machine learning model to apply to the compilation of design 110 during the first phase 501. To determine which model should be selected, compiler device 108 compares the features 502 in netlist 120 with the features listed in these models. In the example of FIG. 5, compiler device 108 selects one of base model 304, tune model 310, and hybrid model 312 to be applied. Compiler device 108 may determine which of base model 304, tune model 310, and hybrid model 312 should be selected by calculating distances between the features 502 in netlist 120 and the features identified in base model 304, tuned model 310, and hybrid model 312. In the example of FIG. 5, compiler device 108 determines a distance 510A between feature 502A and feature 504A in base model 304 and a distance 510B between feature 502B and feature 504B in base model 304. Compiler device 108 also determines a distance 512A between feature 502A and feature 506A in tuned model 310 and a distance 512B between feature 502B and a feature 506B in tuned model 310. Compiler device 108 further determines a distance 514A between feature 502A and a feature 508A in hybrid model 312 and a distance 514B between feature 502B and a feature 508B in hybrid model 312. Compiler device 108 may determine these distances using any suitable process. For example, compiler device 108 may count a number of differences between features to determine the distance. As another example, compiler device 108 may cluster features and determine a distance between the centroids of clusters. By analyzing these distances 510, 512, and 514, compiler device 108 may determine which of base model 304, tuned model 310, and hybrid model 312 best approximates netlist 120 and/or design 110.

In certain embodiments, compiler device 108 weighs the distances 510, 512, and 514 based on the importance of certain features 502. Compiler device 108 may apply weights 516 to distances 510, 512, and 514 to create weighted distances 518, 520, and 524. Weights 516 may indicate the relative importance of features 502 in netlist 120. In the example of FIG. 5, weight 516A may correspond to feature 502A and weight 516B may correspond to feature 502B. As a result, weights 516A and 516B indicate the relative importance of features 502A and 502B. For example, if weight 516A is greater than weight 516B, then feature 502A may be considered more important than feature 502B. On the other hand, if weight 516B is greater than weight 516A, then feature 502B may be considered more important than feature 502A.

Compiler device 108 applies weights 516 to distances 510, 512, and 514 to generate weighted distances 518, 520, and 524. For example, compiler device 108 may multiply distance 510A by weight 516A and distance 510B by weight 516B. Compiler device 108 may then sum the result of these two multiplications to produce weighted distance 518. Compiler device 108 may also multiply distance 512A by weight 516A and distance 512B by weight 516B. Compiler device 108 may then sum the results of these multiplications to produce weighted distance 520. Compiler device 108 may further multiply distance 514A by weight 516A and distance 514B by weight 516B. Compiler device 108 may then sum the results of these multiplications to produce weighted distance 524. Compiler device 108 may apply any suitable number of weights 516 to any suitable number of distances. For example, if netlist 120 included ten different features 502, then there may be ten different weights 516 to apply.

Compiler device 108 selects one of base model 304, tuned model 310, and hybrid model 312 based on weighted distances 518, 520, and 524. For example, compiler device 108 may select the model with the shortest of weighted distance 518, 520, and 524. If weighted distance 518 is shorter than weighted distances 520 and 524, then compiler device 108 selects base model 304. If weighted distance 520 is shorter than weighted distances 518 and 524, then compiler device 108 selects tuned model 310. If weighted distance 524 is shorter than weighted distances 518 and 520, then compiler device 108 selects hybrid model 312. Compiler device 108 then applies the selected model to the compilation of design 110.

Compiler process may repeat this process to select one of base model 304, tuned model 310, and hybrid model 312 during subsequent phases 501 of the compilation process. For example, compiler device 108 may repeat this process during logic adjustment 122 and placement 124. Different models may be selected during different phases 501 because the features 502 may change from phase to phase. For example, even if base model 304 was selected during a first phase 501, features 502 may change during a second phase to cause tuned model 310 to be selected during the second phase 501.

Figure 6:
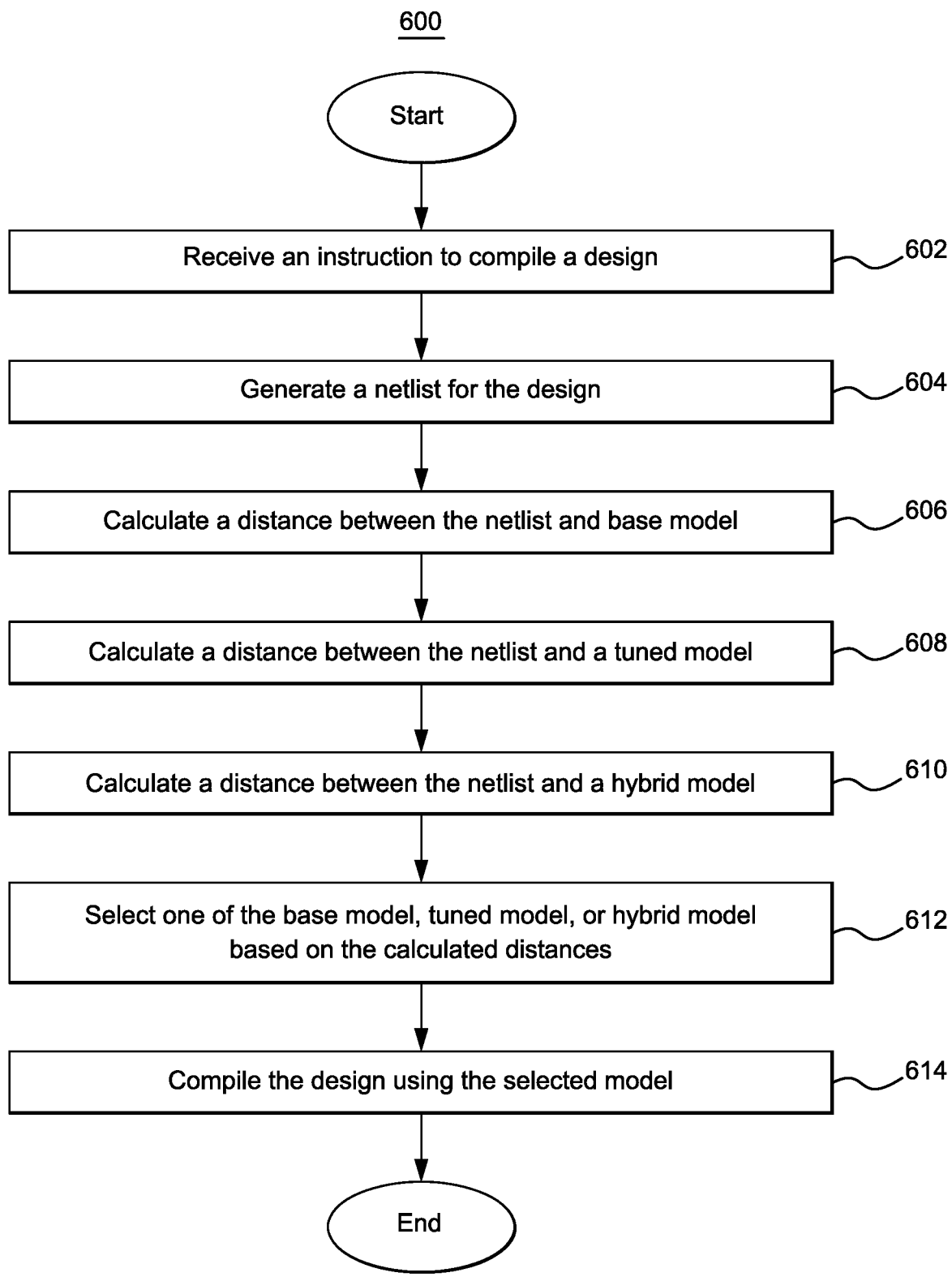
FIG. 6 illustrates a flowchart of a process for selecting a model in the example system of FIG. 1A.

FIG. 6 illustrates a flowchart of a process 600 for selecting a model in the example system 100 of FIG. 1A. Generally, the compiler device 108 may perform process 600 to select the models used in the examples of FIGS. 1A, 1B, 2, 3, 4, and 5. In particular embodiments, by performing process 600, compiler device 108 reduces the compilation time and/or resources consumed when compiling a design.

Compiler device 108 begins by receiving an instruction 116 to compile a design 110 in 602. In certain embodiments, the design 110 is an FPGA design. In response to receiving instruction 116, compiler device 108 initiates compilation of the design 110.

In 604, compiler device 108 generates a netlist 120 for the design 110. Netlist 120 may include a listing of the components of the design 110 and a listing of the connections between the components. Compiler device 108 may analyze netlist 120 to determine an appropriate model to apply to the compilation of the design 110.

In 606, compiler device 108 calculates a distance 518 between the netlist 120 and a base model 304. In certain embodiments, compiler device 108 calculates distance 518 by determining distances 510 between features 502 in netlist 120 and features 504 in base model 304. Compiler device 108 may apply weights 516 to these distances 510 to produce distance 518.

In 608, compiler device 108 calculates a distance 520 between the netlist 120 and a tuned model 310. In certain embodiments, compiler device 108 calculates distance 520 by determining distances 512 between features 502 in netlist 120 and features 506 in tuned model 310. Compiler device 108 may apply weights 516 to these distances 512 to determine distance 520.

In 610, compiler device 108 calculates a distance 524 between the netlist 120 and a hybrid model 312. In certain embodiments, compiler device 108 calculates distance 524 by determining distances 514 between features 502 in netlist 120 and features 508 in hybrid model 312. Compiler device 108 then applies weights 516 to these distances 514 to determine distance 524.

In 612, compiler device 108 selects one of the base model 304, tuned model 310, or hybrid model 312 based on the calculated distances 518, 520, and 524. In certain embodiments, compiler device 108 selects the model with the shortest associated distance 518, 520, or 524.

In 614, compiler device 108 compiles the design using the selected model. In particular embodiments, by applying the selected model to the compilation of the design, compiler device 108 reduces the compilation time and/or resources consumed during compilation.

Although the example of compiling an FPGA design has been used, this disclosure contemplates that compiler device 108 may be used during the compilation of any suitable device, such as for example any suitable circuit and/or any suitable electrical component. For example, compiler device 108 may be used in the design of integrated circuits. Additionally, although the example of reducing compile time resource consumption is described, this disclosure contemplates compiler device 108 being configured to address any concern of a user 102. For example, a user 102 may select any suitable cost function 314 that addresses any concern of the user. The user 102 may select a cost function 314 that focuses on improving factors other than compilation time and resource consumption, such as for example efficiency, power consumption, etc. Compiler device 108 may bias the machine learning models towards the selected cost functions 314 such that when these machine learning models are applied during compilation, the machine learning models will predict place and route strategies that optimize these other factors.

Figure 7:
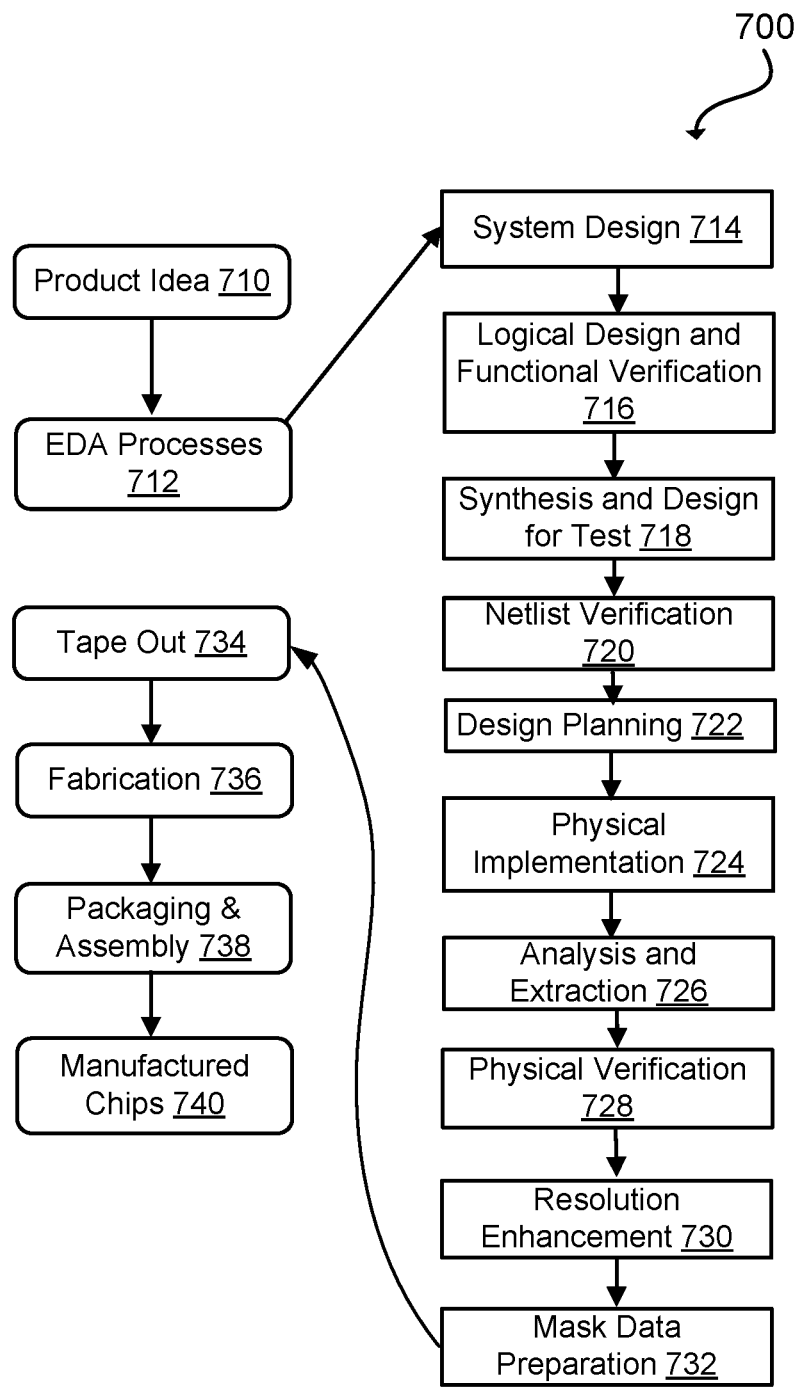
FIG. 7 depicts a flowchart of various processes used during the design and manufacture of an integrated circuit and/or FPGA in accordance with some embodiments of the present disclosure.

FIG. 7 illustrates an example set of processes 700 used during the design, verification, and fabrication of an article of manufacture such as an integrated circuit or FPGA to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 7. The processes described by be enabled by EDA products (or tools).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 900 of FIG. 9, or host system 807 of FIG. 8) may be used to store the programs and data structures that are used by some or all of the EDA products described herein, and products used for development of cells for the library and for physical and logical design that use the library.

Figure 8:
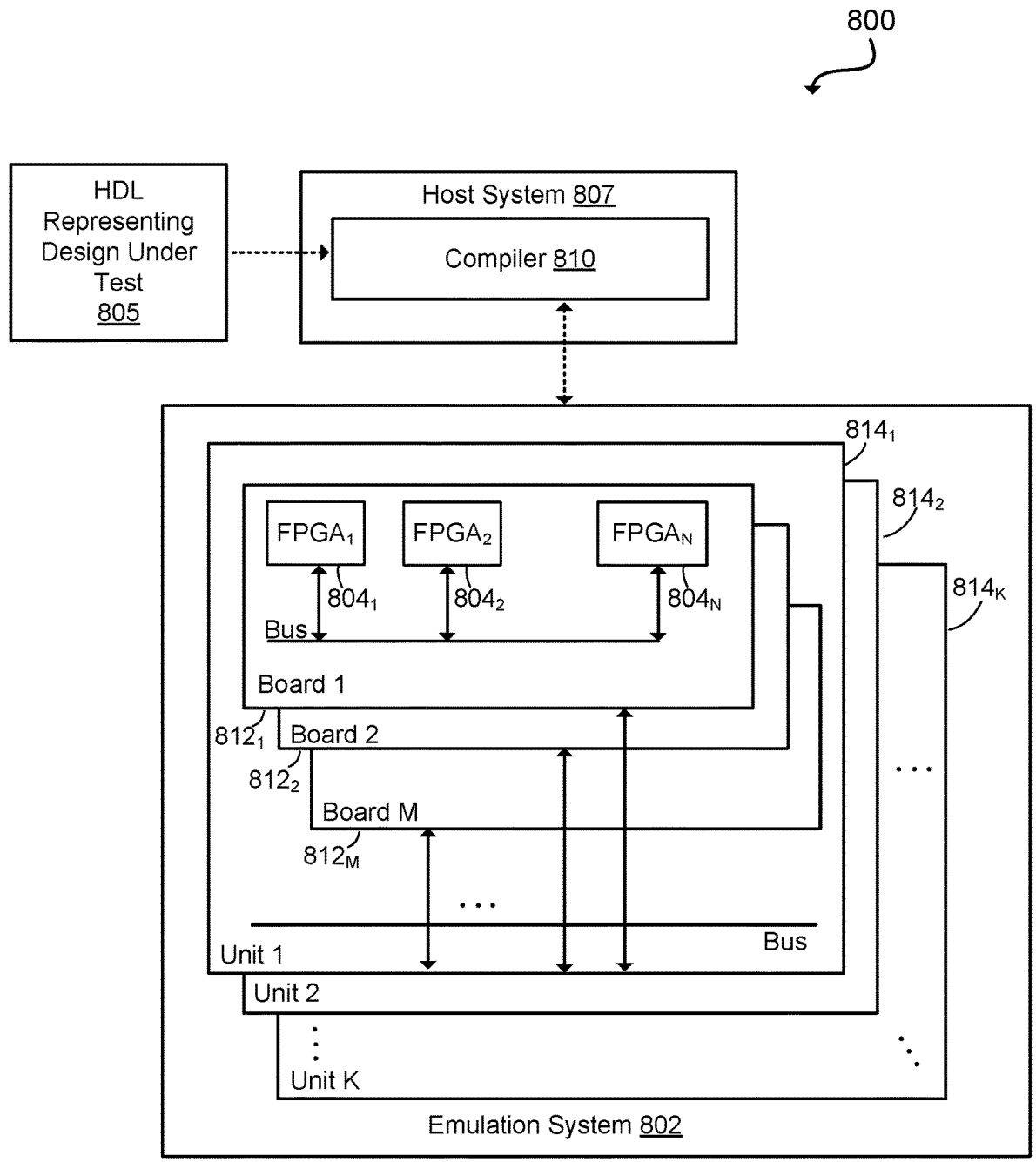
FIG. 8 depicts an abstract diagram of an example emulation system in accordance with some embodiments of the present disclosure.

FIG. 8 depicts an abstract diagram of an example emulation environment 800. An emulation environment 800 may be configured to verify the functionality of the circuit design. The emulation environment 800 may include a host system 807 (e.g., a computer that is part of an EDA system) and an emulation system 802 (e.g., a set of programmable devices such as Field Programmable Gate Arrays (FPGAs) or processors). The host system generates data and information by using a compiler 810 to structure the emulation system to emulate a circuit design. A circuit design to be emulated is also referred to as a Design Under Test ('DUT') where data and information from the emulation are used to verify the functionality of the DUT.

The host system 807 may include one or more processors. In the embodiment where the host system includes multiple processors, the functions described herein as being performed by the host system can be distributed among the multiple processors. The host system 807 may include a compiler 810 to transform specifications written in a description language that represents a DUT and to produce data (e.g., binary data) and information that is used to structure the emulation system 802 to emulate the DUT. The compiler 810 can transform, change, restructure, add new functions to, and/or control the timing of the DUT.

The host system 807 and emulation system 802 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 802.11. The host system 807 and emulation system 802 can exchange data and information through a third device such as a network server.

The emulation system 802 includes multiple FPGAs (or other modules) such as FPGAs $804_1$ and $804_2$ as well as additional FPGAs to $804_N$. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 802 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs $804_1$-$804_N$ may be placed onto one or more boards $812_1$ and $812_2$ as well as additional boards through $812_M$. Multiple boards can be placed into an emulation unit $814_1$. The boards within an emulation unit can be connected using the backplane of the emulation unit or any other types of connections. In addition, multiple emulation units (e.g., $814_1$ and $814_2$ through $814_K$) can be connected to each other by cables or any other means to form a multi-emulation unit system.

For a DUT that is to be emulated, the host system 807 transmits one or more bit files to the emulation system 802. The bit files may specify a description of the DUT and may further specify partitions of the DUT created by the host system 807 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 807 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterwards, the circuit designer can request to re-emulate the same component for a different time period or to re-emulate another component.

A host system 807 and/or the compiler 810 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 805 into gate level logic. For a DUT that is to be emulated, the design synthesizer sub-system receives a description of the DUT. If the description of the DUT is fully or partially in HDL (e.g., RTL or other level of abstraction), the design synthesizer sub-system synthesizes the HDL of the DUT to create a gate-level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

Figure 9:
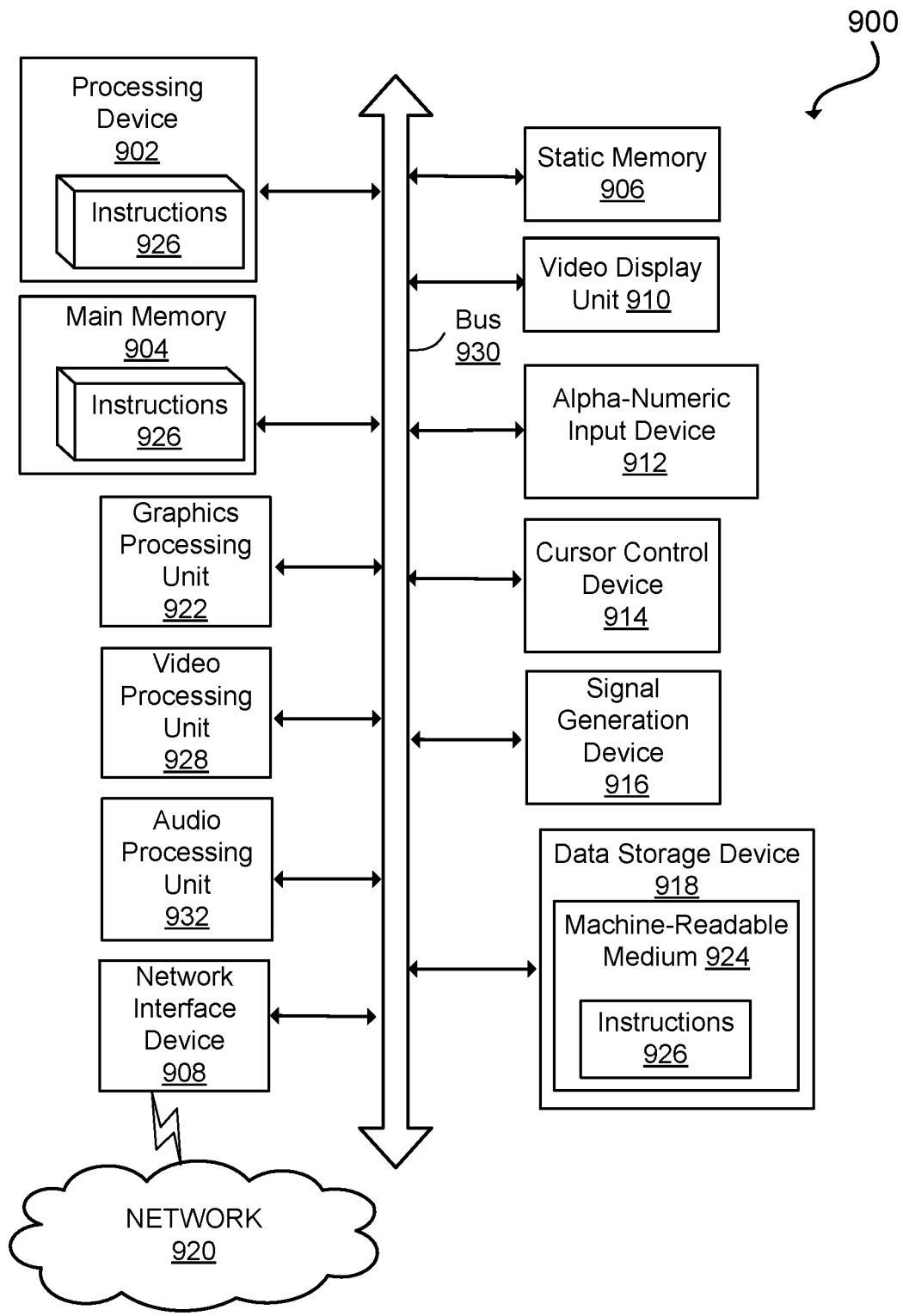
FIG. 9 depicts an abstract diagram of an example computer system in which embodiments of the present disclosure may operate.

FIG. 9 illustrates an example machine of a computer system 900 within which a set of instructions, for causing the machine to perform any one or more of the methodologies discussed herein, may be executed. In alternative implementations, the machine may be connected (e.g., networked)

to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the FIGs and like elements are labeled with like numerals. The disclosure and drawings are, accordingly, to be regarded in an illustrative sense rather than a restrictive sense.

What is claimed is:

1. A method comprising:
storing a base model generated using base data;
receiving training data generated by compiling circuit designs;
generating, using the training data, a tuned model;
generating, using the training data and the base data, a hybrid model, wherein the base model, the tuned model, and the hybrid model effects of place and route strategies;
receiving a cost function selected from a plurality of cost functions comprising a first cost function that biases towards reducing compilation time, a second cost function that biases towards reducing resource consumption during compilation, and a third cost function that biases towards both reducing compilation time and reducing resource consumption during compilation; and
biasing the base model, the tuned model, and the hybrid model using the selected cost function.

2. The method of claim 1, further comprising:
generating a netlist for a circuit design;
predicting, by applying a first machine learning model to the netlist, a first compile time for the circuit design;
selecting a second machine learning model from the base model, the tuned model, and the hybrid model based on the first compile time and based on distances between the netlist and the base model, the tuned model, and the hybrid model;
predicting, by applying a second machine learning model to the netlist, a first place and route strategy based on the first compile time; and
adjusting a logic of the circuit design in accordance with the first place and route strategy.

3. The method of claim 2, further comprising:
predicting, by applying a third machine learning model to the adjusted logic, a second compile time for the circuit design;
selecting a fourth machine learning model from the base model, the tuned model, and the hybrid model based on the second compile time and based on distances between the adjusted logic and the base model, the tuned model, and the hybrid model;
predicting, by applying a fourth machine learning model to the adjusted logic, a second place and route strategy based on the second compile time; and
placing components of the circuit design in accordance with the second place and route strategy.

4. The method of claim 3, further comprising:
predicting, by applying a fifth machine learning model to the placed components, a third compile time for the circuit design;

selecting a sixth machine learning model from the base model, the tuned model, and the hybrid model based on the third compile time and based on distances between the placed components and the base model, the tuned model, and the hybrid model;
predicting, by applying a sixth machine learning model to the placed components, a third place and route strategy based on the third compile time; and
routing the components in accordance with the third place and route strategy.

5. The method of claim 4, further comprising generating a bitstream in accordance with the routing of the components.

6. The method of claim 2, further comprising selecting the base model in response to a determination that a first distance between the netlist and the circuit design is less than a second distance between the netlist and the training data used to generate the tuned model and a third distance between the netlist and the training data and the base data used to generate the hybrid model.

7. An apparatus comprising:
a memory; and
a processor communicatively coupled to the memory, the processor configured to:
store a base model generated using base data;
receive training data generated by compiling circuit designs;
generate, using the training data, a tuned model;
generate, using the training data and the base data, a hybrid model, wherein the base model, the tuned model, and the hybrid model effects of place and route strategies;
receive a cost function selected from a plurality of cost functions comprising a first cost function that biases towards reducing compilation time, a second cost function that biases towards reducing resource consumption during compilation, and a third cost function that biases towards both reducing compilation time and reducing resource consumption during compilation; and
bias the base model, the tuned model, and the hybrid model using the selected cost function.

8. The apparatus of claim 7, wherein the processor is further configured to:
generate a netlist for a circuit design;
predict, by applying a first machine learning model to the netlist, a first compile time for the circuit design;
select a second machine learning model from the base model, the tuned model, and the hybrid model based on the first compile time and based on distances between the netlist and the base model, the tuned model, and the hybrid model;
predict, by applying a second machine learning model to the netlist, a first place and route strategy based on the first compile time; and
adjust a logic of the circuit design in accordance with the first place and route strategy.

9. The apparatus of claim 8, wherein the processor is further configured to:
predict, by applying a third machine learning model to the adjusted logic, a second compile time for the circuit design;
select a fourth machine learning model from the base model, the tuned model, and the hybrid model based on the second compile time and based on distances between the adjusted logic and the base model, the tuned model, and the hybrid model;

predict, by applying a fourth machine learning model to the adjusted logic, a second place and route strategy based on the second compile time; and place components of the circuit design in accordance with the second place and route strategy.

10. The apparatus of claim 9, wherein the processor is further configured to:
predict, by applying a fifth machine learning model to the placed components, a third compile time for the circuit design;
select a sixth machine learning model from the base model, the tuned model, and the hybrid model based on the third compile time and based on distances between the placed components and the base model, the tuned model, and the hybrid model;
predict, by applying a sixth machine learning model to the placed components, a third place and route strategy based on the third compile time; and
route the components in accordance with the third place and route strategy.

11. The apparatus of claim 10, wherein the processor is further configured to generate a bitstream in accordance with the routing of the components.

12. The apparatus of claim 8, wherein the processor is further configured to select the base model in response to a determination that a first distance between the netlist and the circuit design is less than a second distance between the netlist and the training data used to generate the tuned model and a third distance between the netlist and the training data and the base data used to generate the hybrid model.

13. A non-transitory computer readable medium storing instructions that, when executed by a processor, cause the processor to:
receive training data generated by compiling circuit designs;
generate, using the training data, a tuned model;
generate, using the training data and base data, a hybrid model, wherein the base model, the tuned model, and the hybrid model effects of place and route strategies;
receive a cost function selected from a plurality of cost functions comprising a first cost function that biases towards reducing compilation time, a second cost function that biases towards reducing resource consumption during compilation, and a third cost function that biases towards both reducing compilation time and reducing resource consumption during compilation; and
bias, using the selected cost function, the tuned model, the hybrid model, and a base model generated using the base data.

14. The non-transitory computer readable medium of claim 13, wherein the instructions, when executed, further cause the processor to:
generate a netlist for a circuit design;
predict, by applying a first machine learning model to the netlist, a first compile time for the circuit design;
select a second machine learning model from the base model, the tuned model, and the hybrid model based on the first compile time and based on distances between the netlist and the base model, the tuned model, and the hybrid model;
predict, by applying a second machine learning model to the netlist, a first place and route strategy based on the first compile time; and
adjust a logic of the circuit design in accordance with the first place and route strategy.

15. The non-transitory computer readable medium of claim 14, wherein the instructions, when executed, further cause the processor to:
predict, by applying a third machine learning model to the adjusted logic, a second compile time for the circuit design;
select a fourth machine learning model from the base model, the tuned model, and the hybrid model based on the second compile time and based on distances between the adjusted logic and the base model, the tuned model, and the hybrid model;
predict, by applying a fourth machine learning model to the adjusted logic, a second place and route strategy based on the second compile time; and
place components of the circuit design in accordance with the second place and route strategy.

16. The non-transitory computer readable medium of claim 15, wherein the instructions, when executed, further cause the processor to:
predict, by applying a fifth machine learning model to the placed components, a third compile time for the circuit design;
select a sixth machine learning model from the base model, the tuned model, and the hybrid model based on the third compile time and based on distances between the placed components and the base model, the tuned model, and the hybrid model;
predict, by applying a sixth machine learning model to the placed components, a third place and route strategy based on the third compile time; and
route the components in accordance with the third place and route strategy.

17. The non-transitory computer readable medium of claim 16, wherein the instructions, when executed, further cause the processor to generate a bitstream in accordance with the routing of the components.

* * * * *